United States Patent [19]

Hamann et al.

[11] Patent Number: 5,006,775
[45] Date of Patent: Apr. 9, 1991

[54] METHOD AND APPARATUS FOR PREVENTING A CURRENT COLLAPSE IN A PHASE NOT PARTICIPATING IN THE COMMUTATION OF A THREE-PHASE, BLOCK-CURRENT SUPPLIED SYNCHRONOUS MACHINE

[75] Inventors: Jens Hamann, Fuerth-Stadeln; Hartmut Vogt, Herzogenaurach, both of Fed. Rep. of Germany

[73] Assignee: Siemens Aktiengesellschaft, Berlin & Munich, Fed. Rep. of Germany

[21] Appl. No.: 258,826

[22] Filed: Oct. 17, 1988

[30] Foreign Application Priority Data

Oct. 26, 1987 [DE] Fed. Rep. of Germany ....... 3736213

[51] Int. Cl.$^5$ ..................... H02P 5/40; H02K 19/10
[52] U.S. Cl. ............................................ 318/723
[58] Field of Search ................... 363/45, 46, 138; 318/721–723

[56] References Cited

U.S. PATENT DOCUMENTS

| | | | |
|---|---|---|---|
| 4,112,339 | 9/1978 | Lipo | 318/722 |
| 4,137,489 | 1/1979 | Lipo | 318/722 |
| 4,172,991 | 10/1979 | Akamatsu et al. | 318/722 |
| 4,240,020 | 12/1980 | Okuyama et al. | 318/722 |
| 4,565,956 | 1/1986 | Zimmermann et al. | 318/722 |
| 4,777,414 | 10/1988 | Storath et al. | 318/138 |

FOREIGN PATENT DOCUMENTS 0085541 8/1983 European Pat. Off. .
0104909 4/1984 European Pat. Off. .

Primary Examiner—David Smith, Jr.
Attorney, Agent, or Firm—Kenyon & Kenyon

[57] ABSTRACT

A method and apparatus for preventing a current collapse in a phase not participating in the commutation, of a three-phase block current supplied synchronous machine, while the phase currents of the other two phases are being commutated. A control voltage controlling the synchronous machine is acted upon during the commutation of two phase currents by an additional control voltage such that the average of current drop in the down-commutating phase is equal to the average of the negative current rise in the up-commutating phase. Thus, a method and a circuit arrangement for carrying out this method are obtained with which the torque oscillations of a three-phase-feed drive can be reduced substantially.

4 Claims, 3 Drawing Sheets

METHOD AND APPARATUS FOR PREVENTING A CURRENT COLLAPSE IN A PHASE NOT PARTICIPATING IN THE COMMUTATION OF A THREE-PHASE, BLOCK-CURRENT SUPPLIED SYNCHRONOUS MACHINE

BACKGROUND OF THE INVENTION

The present invention relates to a method and apparatus for preventing a current collapse in a phase not participating in the commutation, of a three-phase, block current supplied synchronous machine while the phase currents of the other two phases commutate.

Synchronous machines with trapezoidal electromotive force (EMF) generate a constant torque if supply with block currents. Therefore, such machines are used in three-phase feed drives. The block currents are generated by means of a converter, where a rotating field is generated in the machine by means of a control unit and a control voltage. In addition, the torque is proportional to the machine current. It was found that torque collapses are caused by current collapses in a phase not participating in the commutation during the commutation of the two other phase currents of the three-phase block-current supplied synchronous machine.

SUMMARY OF THE INVENTION

It is an object of the present invention to provide a method and apparatus for preventing a current collapse in a phase not participating in the commutation, of a three-phase block-current supplied synchronous machine while the other two phase currents in the other two phases commutate, whereby the torque oscillations of a block-current supplied synchronous machine is reduced considerably.

The above and other objects of the invention are achieved by a method for preventing a current collapse in a phase not participating in a commutation, of a three-phase block current supplied, synchronous machine while the phase currents of the two other phases are being commutated, wherein, during the commutation of two phase currents a control voltage controlling the synchronous machine is acted upon by an additional control voltage such that the average of the current drop in the down-commutating phase is equal to the average of the negative current rise in the up-commutating phase.

Since the currents in the phases participating in the commutation do not on the average commutate up and down uniformly, a larger voltage is on the average present at the commutating-off phase than at the up-commutating phase. While the current in the commutating-off phase is already zero, the up-commutating current has reached, for instance, only 80% of its reference value at this point in time. As a result, the current and the power in the phase not participating in the commutation have a collapse. So that the current collapse in the phase not participating in the commutation is reduced considerably, the control voltage of the converter of the synchronous machine is acted upon during the commutation of two phase currents by an additional control voltage, the amplitude being set so that the average of the current drop in the commutating-off phase is equal to the average of the negative current rise in the up-commutating phase.

In a block-current supplied synchronous machine, where pulse-width-modulated pulses for the converter of the synchronous machine are generated by means of a high-frequency, triangular sampling voltage and a control voltage by superimposing the two voltages, the amplitude of the additional control voltage can be derived from the relationship $$a_z = \tfrac{1}{3} + \tfrac{2}{3} \cdot e/U_d$$

where e = maximum electromotive force (EMF) for a speed of rotation n and $U_d$ = intermediate-link voltage of the converter. The ohmic voltage drop $i \times R$ per leg was neglected here since this voltage drop $i \times R << U_d/3$.

In the lower speed range of a three-phase feed drive, the electromotive force is $e << U_d$, whereby the second term of the relationship for determining the amplitude of the additional control voltage goes toward zero. Thereby, the amplitude of the additional control voltage can be chosen to be $\tfrac{1}{3} U_{soll\,max}$ in a three-phase feed drive, the converter of which is controlled by pulse-width-modulated pulses which are generated by the super-position of a high-frequency triangular sampling voltage and a control voltage.

By the additional control voltage which is superimposed only during the commutation of the control voltage controlling the synchronous machine, it is achieved that the current collapse in a phase not participating in the commutation are reduced considerably, whereby the torque oscillations too, is reduced considerably.

Since during the commutation of two phase currents, the additional control voltage of the control voltage controlling the synchronous machine is acted upon, the start and the end of the commutation must be determined.

The start of the commutation is determined from existing position signals which are present at the output of a rotor position encoder connected to the synchronous machine. A signal which documents the start of the commutation operates a switch, whereby the additional control voltage is superimposed on the control voltage of the converter.

The end of the commutation is determined from measuring the commutating-off current, where this commutating-off current is monitored for a limit, i.e., as soon as the commutating-off current has reached the value zero, a signal actuates the switch in such a manner that the additional control voltage is no longer superimposed on the control voltage.

The end of the commutation can also be determined from the relationship $$T_K = \frac{|J| \cdot 3 \cdot L_D}{U_d + 2 \cdot e}$$

where $T_K$ = commutation time,
   $|J|$ = magnitude of a commutating-off current,
   $U_d$ = intermediate-link voltage of the converter,
   e = maximum electromotive force (EMF) for a speed n,
   $L_D$ = three-phase inductance.

In one advantageous circuit arrangement for carrying out the method with a block-current supplied synchronous machine which is equipped with a converter, a tachometer generator, a rotor position encoder and a controller, where the output of the controller is linked to an input of a control unit of the converter, a summing element is arranged between the output of the controller and the input of the control unit, and its second input is connected via a switch to a device for generating an additional control voltage, where this switch can be switched on via a commutation pickup which is connected to the output of the rotor position encoder, and can be switched off via a device for determining the end of the commutation.

With this circuit arrangement, an additional control voltage which is superimposed during the commutation of two phase currents on the control voltage of the control unit can be generated over the entire speed range of the three-phase feed drive as a function of the speed. The start of the commutation is determined here from the existing position signals by means of a known circuit arrangement. The end of the commutation is derived from the waveform of the measured commutating-off current, i.e., the end of the commutation is reached as soon as the commutating-off current is equal to zero. Thus, a circuit arrangement is obtained with which one can reduce the torque oscillations considerably relative to the entire speed range.

In a particularly simple circuit arrangement, a voltage source is provided as the additional control voltage, the output voltage of which has the value $\frac{1}{3}U_{soll\ max}$. The output voltage of this voltage source is superimposed on the control voltage via the switch during the commutation of two phase currents. Thereby, also the torque ripple is reduced considerably, but only at speeds in the lower speed range of the three-phase feed drive.

BRIEF DESCRIPTION OF THE DRAWINGS

For a further explanation of the invention, reference is made to the drawings, in which embodiments according to the invention are illustrated schematically.

DETAILED DESCRIPTION

Figure 1:
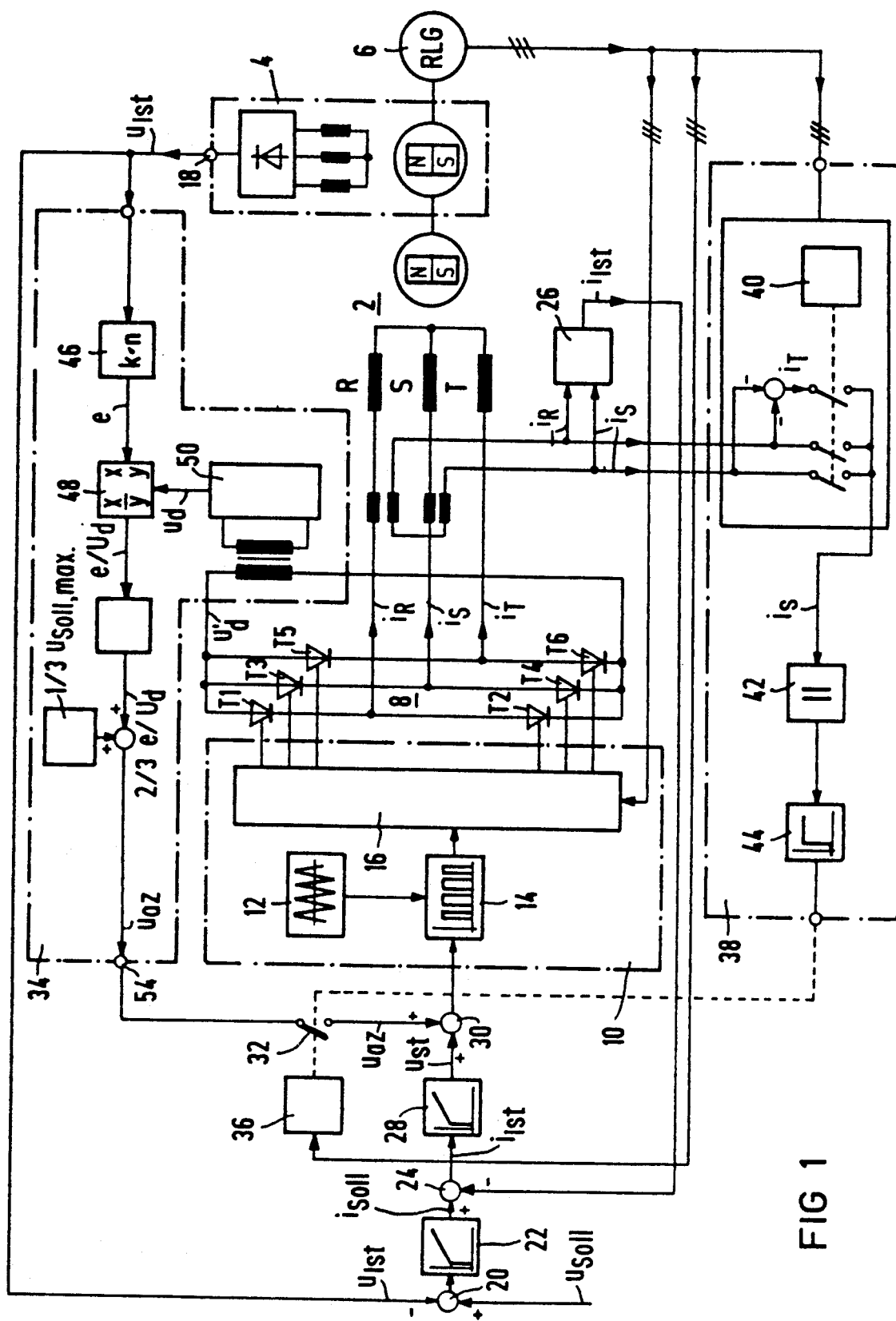
FIG. 1 shows a circuit arrangement for carrying out the method according to the invention.

In FIG. 1, a synchronous machine 2 followed by a tachometer generator 4 and by a rotor position encoder 6 is illustrated where the stator phases R, S, and T of the synchronous machine 2 are linked with a converter 8. The converter 8 is designed as a six-pulse bridge circuit with the semiconductor switches T1 to T6, where the bypass diodes have been dispensed with for reasons of clarity. The firing signals for the semiconductor switches T1 to T6 of the converter 8 are generated as a function of a control voltage $u_{St}$ in a control unit 10. The control unit 10 contains a pulse frequency generator 12 which furnishes a triangular high-frequency sampling voltage, a pulse frequency generator 14 and a pulse distribution logic 16. As the pulse frequency generator 12 can also be provided generators which supply a sawtooth voltage or an asymmetrical triangular voltage as the sampling voltage. In the pulse width modulator 1, a pulse-width-modulated signal which is fed to the pulse distribution logic 16 is generated from a control voltage and the sampling voltage. This pulse-width-modulated signal is then distributed over the control inputs of the semiconductor switches T1 to T6.

In the synchronous machine 2, a speed control with a subordinated current control is provided. The speed of the synchronous machine 2 is determined by means of a tachometer generator 4, at the output 18 of which a speed-proportional voltage $u_{ist}$ is present as the actual speed value. This actual speed value $u_{ist}$ is fed to a comparator 20 with two inputs. At the minus input is present the actual value $u_{ist}$ of the speed n and at the plus input, the reference value $u_{soll}$. At the output of the comparator 20 is present a control difference or a speed difference which is fed to a speed control 22. A PI controller is provided as the speed control. At the output of the speed controller 22, a current reference $i_{soll}$ can be taken off which is feed to a second comparator 24 with two inputs. At the plus input of this comparator 24, the current reference value $i_{soll}$ is present and at the minus input of this comparator 24, a current actual value $i_{ist}$ is fed. This actual current value $i_{ist}$ was formed from two phase currents $i_R$ and $I_S$ by means of a device 26 for forming the actual current value. Such a device 26 is known for forming the actual current value in three-phase block current supplying from German Offenlegungsschrift DE 35 16 208. The control difference or current difference of this comparator 24 is fed to a current controller 28. This current controller 28 is also a PI controller, at the output of which the control voltage $u_{St}$ for the control unit 10 is present.

This control voltage is not fed directly to the control unit 10, but via a summing element 30. At the second input of this summing element 30 is connected via a switch 32 a device 34 for generating an additional control voltage $u_{az}$. The switch 32 is actuated on the one hand by a commutation pickup 36 and on the other hand by a device 18 for determining the end of the commutation. Access to the switch 32 is shown by respective dash-dotted lines. Here, the switch 32 is switched-on by the commutation pickup 36 and is switched off by the device 38 for determining the end of the commutation. The position signals of the rotor position encoder 6 are fed to the commutation pickup 36 and to the device 38. The rotor position encoder 6 generates three binary position signals offset relative to each other by 120° which are synchronized with the current blocks of the synchronous machine 2. By means of these position signals and the commutation pickup 36 which in the simplest case may be an electronic evaluation circuit for the edges of the position signals, the start of the commutation is determined and the switch 32 closed. Thereby, an additional control voltage $u_{az}$ is superimposed on the control voltage $u_{St}$ which controls the synchronous machine 2, the additional control voltage $u_{az}$ being generated by the device 34. To this device for generating an additional control voltage $u_{az}$ is fed on the one hand a speed-proportional signal $u_{ist}$ from the tachometer generator 4 and a voltage Uhd d proportional to the intermediate link voltage. As long as, for instance, the phase current $i_S$ is commutated-down and the phase current $i_T$ is commutated-up, the additional control voltage $u_{az}$ is superimposed on the control voltage $u_{St}$. The end of the commutation is determined by means of the device 38. Here the phase currents $i_R$ and $i_S$ are fed to a selection member 40 for measuring the down-commutating current to the device 38. This section member 40 generates the third phase current $i_T$ from the phase current $i_R$ and $i_S$ according to the equation $i_R + i_S + i_T = 0$. Each phase current $i_R$, $i_S$ and $i_T$ is fed to a switch, the outputs of which are connected electrically parallel. These switches of the selection member 40 are actuated by means of an electronic evaluation circuit for the edges of the position signals and the position signals of the rotor position encoder 6. By this selection member 40, the commutating-down leg current is determined, i.e., the phase current $i_S$ in this example. This phase current $i_S$ is fed to an absolute magnitude former 42, the output of which is linked to a threshold switch 44. The threshold switch 44 generates an output signal as soon as the down-commutating phase current $i_S$ reaches the value zero. By emitting the output signal which documents the end of the commutation, the switch 32 is opened and the additional control voltage $u_{az}$ is no longer superimposed on the control voltage $u_{St}$.

Since the current drop in the down-commutating phase S is on the average not equal to the current rise in the up-commutating phase T on the average, it can happen that at the point in time at which the phase current $i_S$ in the phase S has already been commutated-down, the phase current $i_T$ in the leg T has reached, for instance, only 80% of its reference value. Thereby, a larger voltage is present on the average at the down-commutating phase S than in the up-commutating phase T. As a result, the current $i_R$ in the phase R and the power have a collapse. In order to prevent this, the additional control voltage $u_{az}$ is superimposed on the control voltage $u_{St}$ in such a manner than on the average the current drop $\overline{di_S/dt}$ in the down-commutating phase S is on the average equal to the negative current rise $\overline{di_{GT}/dt}$ in the up-commutating phase T. With the aid of this condition, a relationship can be given for each control method, from which the amplitude $a_z$ of the additional control voltage $u_{az}$ can be derived. Assuming constant drive, i.e., a high-frequency triangular sampling voltage, a d-c control voltage is superimposed and for the additional control voltage $u_{az}$ the generally applicable condition, namely, $\overline{di_S/dt} = -\overline{di_T/dt}$, one arrives at the relationship $$a_z = \tfrac{1}{3} + \tfrac{2}{3} \cdot e/U_d$$

for the amplitude $a_z$ of the additional control voltage $u_{az}$. This relationship for the additional control voltage $u_{az}$ depends on the electromotive force (EMF) e and on the voltage $u_d$ proportional to the intermediate link voltage. To the device 34 for generating an additional control voltage $u_{az}$ is brought on the input side the output voltage $u_{ist}$ of the tachometer generator 4 and the intermediate-linked voltage $U'_d$. The output voltage $u_{ist}$ which represents a speed-proportional voltage, is converted by means of a speed-proportional voltage former 46 into the EMF voltage e which is fed to a first input x of a quotient former 48. The intermediate-linked voltage $U'_d$ is converted by means of a normalizing stage 50 which in the simplest case can be a voltage divider, into a voltage $U_d$ proportional to the intermediate-voltage and is fed to a second input y of the quotient former 48. At the output of the quotient former 48, a voltage quotient $e/U_d$ is present. This voltage quotient $e/U_d$ is multiplied by a constant and subsequently fed to a first input of a summing stage 52. To the second input of the summing stage 52 is fed a constant voltage with the value $\tfrac{1}{3}$ $u_{soll\,max}$. At the output 54 of the device 34, an additional control voltage $u_{az}$ is present, the amplitude $a_z$ of which can be derived from the relationship $$a_z = \tfrac{1}{3} + \tfrac{2}{3} \cdot e/U_d$$

By this circuit arrangement, an additional control voltage $u_{az}$ is superimposed only during the commutation of two phase currents $i_S$ and $i_T$ of the control voltage $u_{St}$ of the control unit 10 of the converter 8. It is achieved thereby that a current collapse of the phase current $i_R$ in a phase R not participating in the commutation is reduced substantially, whereby also torque collapses are reduced. Thus, a circuit arrangement is obtained by which the torque oscillations of a permanently excited three-phase feed drive can be reduced substantially.

Figure 2:
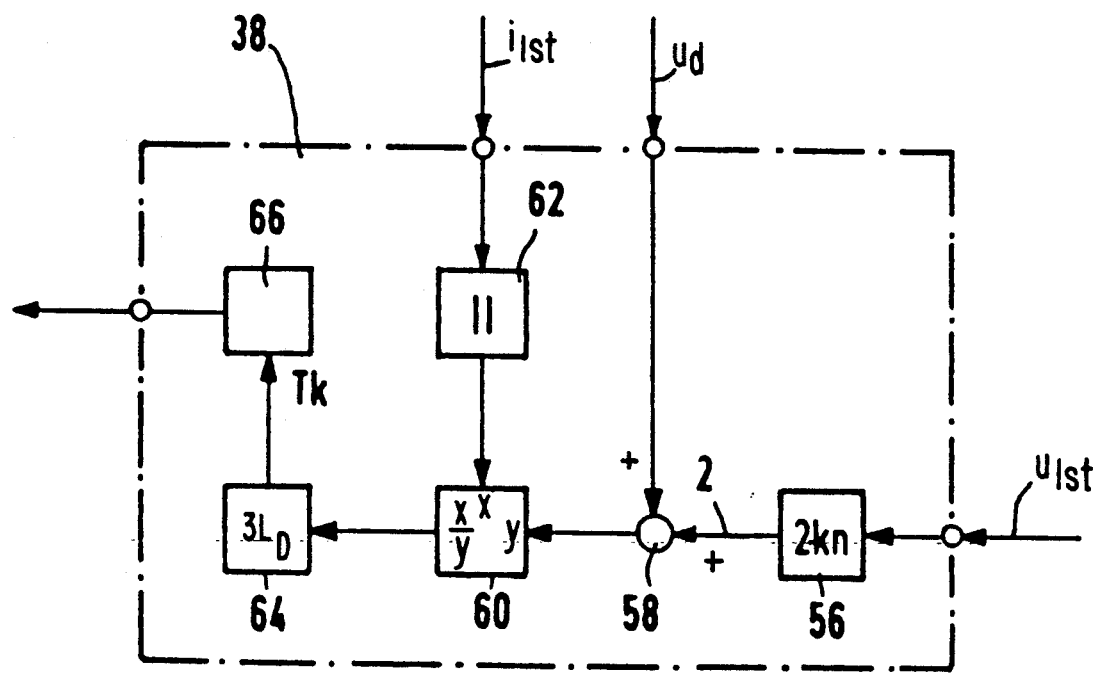
FIG. 2 shows a further device for determining the end of the commutation.

FIG. 2 shows a further embodiment of the device 38 for determining the end of the commutation. In this embodiment, the commutating time $T_K$ is derived from the relationship $$T_K = \frac{|J| \cdot 3 \cdot L_D}{U_d + 2 \cdot e}$$

This relationship for the commutation time $T_K$ is derived from the relationship for the average down-commutating current rise $\overline{di_S/dt}$, taking into consideration the mentioned control method, namely, the superimposition of a triangular high-frequency sampling voltage on a d-c control voltage. According to the relationship of the commutating time $T_K$, the output voltage $u_{ist}$ of the tachometer generator 4 is fed to the device 38; this output voltage is converted by means of a speed-proportional voltage former 56 into an EMF voltage $2e$ which is present at its output. To this EMF voltage $2e$ is added by means of a summing stage 58 the normalized intermediate-link voltage $U_d$. The output voltage $U_d + 2e$ of the summing element 58 is fed to an input y of a quotient former 60, at the other input x of which an absolute magnitude of the output current I of an absolute magnitude former 62 is present. At the input of the absolute magnitude former 62, an actual current value $I_{ist}$ is present which was formed from two phase currents $i_R$ and $i_S$ according to FIG. 1 by means of a device 26 for forming actual current values. At the output of the quotient former 60 an absolute quotient magnitude $I/(U_d+2e)$ is present, which is multiplied via a constant member 64 by a constant with the value $3\,L_D$. At the output of this constant member 64, the commutation time $T_K$ is obtained which is fed to a programmable time delay member 66. This programmable time delay member 66, contains, for instance, a programmable backward counter which is set by the commutation time $T_K$ present to a counter reading proportional to the commutating time $T_K$ and counts backwards toward zero. When the counter reading zero is reached, the commutating time $T_K$ has passed and the backward counter delivers a signal which opens the counter 32 to FIG. 1.

Figure 3:
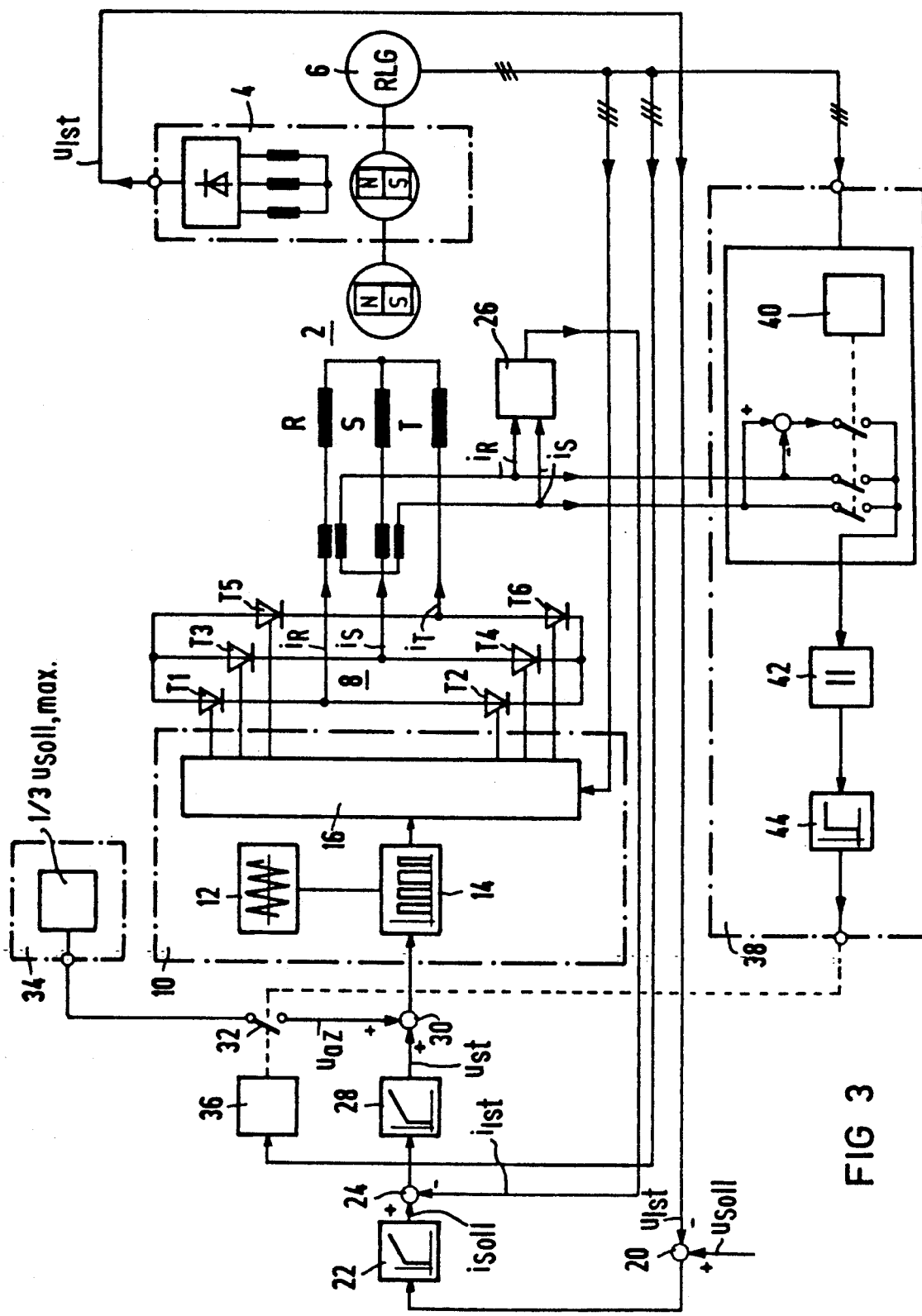
FIG. 3 illustrates a particularly simple circuit arrangement for carrying out the method according to the invention.

In FIG. 3, a particularly simple circuit arrangement according to FIG. 1 is shown. In this circuit arrangement, only the device 34 has been changed form the circuit arrangement according to FIG. 1. All other components of this circuit arrangement are identical with the components of the circuit arrangement according to FIG. 1. For this reason, like components also have the same reference symbols. In this circuit arrangement, the device 34 for generating an additional control voltage $u_{az}$ consists of a constant voltage source with the value $\tfrac{1}{3}$ $u_{soll\,max}$, i.e., from the relationship for the amplitude $a_z$ of the additional control voltage $u_{az}$, the second term, namely, $\tfrac{2}{3} \cdot e/U_d$, has been neglected since for speeds from the lower speed range of the three-phase feed drive, the quotient $e/U_d$ goes toward zero. Thereby, a particularly simple circuit arrangement for carrying out the method for preventing a current collapse in a phase not participating in a commutation, of a three-phase block current supplied synchronous machine 2 is obtained.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. A circuit arrangement for preventing a current collapse in a phase not participating in a commutation of a three-phase block current supplied synchronous machine while phase currents of two other phases are being commutated, comprising means for applying, during the commutation of said two phase currents, an additional control voltage to a control voltage controlling the speed of the synchronous machine such that the average current drop in a down-commutating phase is equal to the average negative current rise in an up-commutating phase, said block current supplied synchronous machine being equipped with a converter, a tachometer generator, a rotor position encoder and a controller, an output of the controller being tied to an input of a control unit of the converter and a summing element being arranged between the output of the controller and the input of the control unit, the summing element having a second input which is linked via a switch to a device for generating an additional control voltage, the switch being switched on via a commutation pickup which is tied to an output of the rotor position encoder and being switched off via a device for determining the end of the commutation.

2. The circuit arrangement recited in claim 1, wherein the device for generating an additional voltage is linked on an input side to the tachometer generator and to the intermediate circuit of the converter, the output voltage of the tachometer generator being connected via a speed-proportional voltage former to a first input of a quotient former, the quotient former having a second input tied via a normalizing member to the intermediate link of the converter, and being connected on an output side to a summing element, one input of the summing element being connected to a voltage source, and the another input of the summing element being connected via a constant member to the output of the quotient former.

3. The circuit arrangement recited in claim 1, wherein the device for determining the end of the commutation is connected on an input side to a selection member for measuring the down-commutating current, the selection member having an output connected via an absolute magnitude former to a threshold switch and the device for determining the end of the commutation being connected on an output side to the output of the threshold switch.

4. The circuit arrangement recited in claim 1, wherein the device for determining the end of the commutation comprises on an input side a speed-proportional voltage former having an output connected via a summing element to a quotient former having a second input, the intermediate link voltage being present on the second input and a first input of the quotient former being connected to an output of an absolute magnitude former having an input having an actual current value present thereon and having an output coupled to a programmable time delay member, the input of which having an input tied to the output of the quotient former via a constant member.

* * * * *